US009080609B2

(12) United States Patent
Itagaki et al.

(10) Patent No.: US 9,080,609 B2
(45) Date of Patent: Jul. 14, 2015

(54) RIBBON CAGE AND MANUFACTURING METHOD THEREOF

(71) Applicant: NSK LTD., Tokyo (JP)

(72) Inventors: Keita Itagaki, Kanagawa (JP); Yuuki Mizushima, Kanagawa (JP); Kazuto Kobayashi, Kanagawa (JP)

(73) Assignee: NSK Ltd. (JP)

( * ) Notice: Subject to any disclaimer, the term of this patent is extended or adjusted under 35 U.S.C. 154(b) by 0 days.

(21) Appl. No.: 14/394,818

(22) PCT Filed: Apr. 16, 2013

(86) PCT No.: PCT/JP2013/061280
§ 371 (c)(1),
(2) Date: Oct. 16, 2014

(87) PCT Pub. No.: WO2013/157543
PCT Pub. Date: Oct. 24, 2013

(65) Prior Publication Data
US 2015/0071580 A1     Mar. 12, 2015

(30) Foreign Application Priority Data

Apr. 17, 2012 (JP) ................................. 2012-093508

(51) Int. Cl.
| F16C 33/42 | (2006.01) |
| F16C 33/38 | (2006.01) |
| F16C 33/46 | (2006.01) |
| F16C 19/06 | (2006.01) |
| F16C 43/04 | (2006.01) |

(52) U.S. Cl.
CPC ............... *F16C 33/38* (2013.01); *F16C 33/427* (2013.01); *F16C 33/467* (2013.01); *F16C 19/06* (2013.01); *F16C 43/04* (2013.01); *F16C 2240/40* (2013.01)

(58) Field of Classification Search
CPC ...... F16C 33/427; F16C 33/38; F16C 33/467; F16C 43/04
See application file for complete search history.

(56) References Cited

U.S. PATENT DOCUMENTS

| 1,480,998 A * | 1/1924 | Dlesk ....................... 29/898.064 |
| 2,590,939 A * | 4/1952 | Cobb ............................ 384/530 |
| 5,806,990 A * | 9/1998 | Ueno et al. .................... 384/530 |

FOREIGN PATENT DOCUMENTS

| JP | 19678 | 4/1911 |
| JP | 04-004938 | 1/1992 |
| JP | 07-301242 | 11/1995 |

(Continued)

*Primary Examiner* — Thomas R. Hannon
(74) *Attorney, Agent, or Firm* — Hartman Global IP Law; Gary M. Hartman; Domenica N.S. Hartman

(57) ABSTRACT

Characteristics of joint sections using rivets $11a$ that join flat sections $12a$, $12b$ of a pair of cage elements are improved regardless of differences in the volumes of the rivets $11a$. A head section $16a$ and a crimped section $19a$ of a rivet $11a$ comprise flange sections $23a$, $23b$ and convex sections $24a$, $24b$. The inside surfaces of the flange sections $23a$, $23b$ press against the outside surfaces of the flat sections $12a$, $12b$. The convex sections $24a$, $24b$ have a truncated cone shape with the maximum diameter being on the flange section $23a$, $23b$ side. The diameter $d_{24}$ of the apex of the convex sections $24a$, $24b$ is equal to or less than the inner diameter $R_{15}$ of circular holes 15, and the outer diameter $D_{23}$ of the flange sections $23a$, $23b$ is equal to or greater than the outer diameter $D_{24}$ of the bottom section of the convex sections $24a$, $24b$. Furthermore, the amount of protrusion $L_{23}$ that the flange sections $23a$, $23b$ protrude from the convex sections $24a$, $24b$ is equal to or less than two times the thickness $T_{23}$ in the axial direction of the flange sections $23a$, $23b$.

7 Claims, 4 Drawing Sheets

(56) References Cited

FOREIGN PATENT DOCUMENTS

| JP | 10-281163 | 10/1998 |
| JP | 11-179475 | 7/1999 |
| JP | 2009-008164 | 1/2009 |
| JP | 2009-236227 | 10/2009 |

* cited by examiner

RIBBON CAGE AND MANUFACTURING METHOD THEREOF

CROSS REFERENCE TO RELATED APPLICATIONS

This application claims the benefit of International Application No. PCT/JP2013/061280 filed Apr. 16, 2013, having a priority claim to Japanese patent application number JP2012-093508 filed Apr. 17, 2012. The contents of these prior applications are incorporated herein by reference.

TECHNICAL FIELD

The present invention relates to a ribbon cage and a manufacturing method thereof that holds balls of a rolling bearing, such as a radial ball bearing, that is assembled in a rotation support section of a mechanical device such as an automobile, general industrial machinery, machine tools and the like. More particularly, the present invention relates to construction and a method for achieving the construction of a rivet joint section that joins a pair of cage elements of a ribbon cage.

BACKGROUND ART

FIG. 3 illustrates a single-row deep-groove ball bearing 1 that is used as a rolling bearing that is assembled in a rotation support section of various kinds of mechanical devices. The ball bearing 1 has: an inner ring 3 having an inner-ring raceway 2 formed around the outer-circumferential surface thereof; an outer ring 5 having an outer-ring raceway 4 formed around the inner-circumferential surface thereof, plural balls 6 provided between the inner-ring raceway 2 and the outer-ring raceway 4; and a cage 7 holding the balls 6 so as to be able to roll freely. Furthermore, in the example illustrated in the figure, openings on both ends of a space 9 where the balls 6 and cage 7 are located, are closed off by a pair of seal rings 8.

There are various kinds of cages, however, the cage 7 illustrated in the figure is called a ribbon cage, with the construction thereof being disclosed, for example, in JP H07-301242 (A), JP H10-281163 (A), JP H11-179475 (A), JP 2009-008164 (A), JP 2009-236227 (A) and the like. As illustrated in FIG. 4, the ribbon cage 7 is constructed such that a pair of cage elements 10 is joined by plural rivets 11. Each of the cage elements 10 is made of a metal plate material such as steel plate, stainless steel plate and the like, and obtained by bending the material in the circumferential direction while at the same time punching out the material into a ring shape by a pressing process so that there are flat sections 12 and semi-circular shaped sections 13 that are alternatively arranged in the circumferential direction. The pair of cage elements 10 is such that, with the flat sections 12 placed face to face with each other, the cage elements are joined and fastened together by rivets 11, and the portions that are surrounded by the semi-circular shaped sections 13 of one of the cage elements 10 and the semi-circular shaped sections 13 of the other cage element 10 function as pockets 14 for holding the balls 6 so as to roll freely.

In order to maintain the product quality of this kind of ribbon cage 7 and display the desired performance for the ball bearing 1, it is essential that the characteristics of the joint sections between the flat sections 12 made using the rivets 11 be good. For example, the precision of the dimensions of each of the rivets 11 has an effect on the characteristics of the joint sections between the flat sections 12. However, from the aspect of product cost, it is desirable that the rivets 11 be made at a very low cost, and thus strictly restricting the manufacturing tolerance is not preferred. Therefore, some volume variations occur among plural rivets 11. The problems that occur due to these volume variations will be explained with reference to FIGS. 5A and 5B.

As illustrated in FIGS. 5A and 5B, in order to join and fasten the pair of cage elements 10 using rivets 11, circular holes 15 are formed in each of the portions where the flat sections 12a, 12b of the cage elements 10 come together. Each of the rivets 11 is made of a plastically deformable metallic material such as mild steel, copper alloy or the like that is capable of maintaining the required strength and rigidity, and has an outward-facing flange shaped head section 16 and a circular column shaped rod section 17. The outer diameter of the head sections 16 is larger than the inner diameter of the circular holes 15, and the outer diameter of the rod sections 17 in the state before the tip-end sections are crimped is the same as or a little smaller than the inner diameter of the circular holes 15.

In order to join the flat sections 12a, 12b together with rivets 11, the rod sections 17 are inserted through the circular holes 15, while at the same time the inside surfaces of the head sections 16 that face one of the flat sections 12a are brought into contact with the outside surfaces of the flat sections 12a that are the surfaces on the opposites side of the other flat sections 12b. In this state, the tip-end sections of the rod sections 17 protrude from the outside surfaces of the other flat section 12b. Furthermore, the rivets 11 are pressed and crushed in the axial direction by a pair of crimping dies 18a, 18b, to form crimped sections 19 on the tip-end sections of the rod sections 17. Of the crimping dies 18a, 18b, truncated cone shaped concave sections 20a, 20b are formed in the portions that are aligned with the circular holes 15 and that press and crush the rivets 11 from both sides in the axial direction. The pair of cage elements 10 are joined and fastened together by rivets 11 at plural locations that are uniformly spaced in the circumferential direction, and when doing this, the plural rivets 11 are crimped simultaneously. In other words, the plural rivets 11 are plastically deformed simultaneously by the pair of crimping dies 18a, 18b that have ring-shaped pressure sections (crimping sections) located on both sides of the pair of cage elements 10. By regulating the amount that the crimping dies 18a, 18b move (approach to each other), the dimension in the axial direction of all the rivets 11 coincide after crimping has been completed. That is, after the crimping dies 18a, 18b arrive at the position in the stroke nearest each other, it is determined that crimping of the rivets 11 is completed.

As long as the volume of the plural rivets 11 is an appropriate value, and as long as the volume of each rivet 11 is the same, then at the same time that the head sections 16 are filled into the concave sections 20a of one of the crimping dies 18a and plastically deformed a little, the tip-end sections of the rod sections 17 are filled into the concave sections 20b of the other crimping die 18b and plastically deformed a lot, and the inside surfaces of the flat sections 12a, 12b that face each other come in contact with each other with no space in between. In this case, the characteristics of the joint sections with the rivets 11 between the pair of cage elements 10 are good, and no particular problems occur.

However, when the volume of the rivet 11 is too small, then, as illustrated in FIG. 5A, even when the crimping dies 18a, 18b arrive at the position in the stroke nearest each other, the tip-end section of the rod section 17 of the rivet 11 is not sufficiently filled inside the concave section 20b of the other crimping die 18b, so the shape and size of the crimped section 19 that is formed from the tip-end section are not sufficient. In this state, the flat sections 12a, 12b located between the crimped section 19 and the head section 16 cannot be sufficiently pressed together, so a gap 21 occur between the flat sections 12a, 12b. When the ball bearing 1 is operated in a state when such a gap 21 occurs, it becomes easy for strange noise such as a beating noise or vibration to occur. Moreover, not only is the strength and rigidity of the obtained cage 7 insufficient, in severe cases, the inner diameter of the pockets 14 becomes larger than the proper value, and there is a possibility that balls 6 will drop out from the pockets 14.

On the other hand, as illustrated in FIG. 5B, when the volume of a rivet 11 is excessively large, the outer circumferential edge part of the head section 16 protrudes out into a gap between the inside surface of one of the crimping dies 18a and the outside surfaces of one of the flat sections 12a, and a thin burr 22 is formed in that portion. There is also a possibility that this kind of burr will be formed in the outer circumferential edge part of the crimped section 19. The thin burr 22 can easily break away from the outer circumferential edge of the head section 16 or crimped section 19, and a burr 22 that has broken away becomes a metal fragment that can become caught inside the space 9 of the ball bearing 1; and as the ball bearing 1 rotates, there is a possibility that the inner-ring raceway 2, outer-ring raceway 4 and rolling surfaces of the balls 6 (see FIG. 3) will become damaged, and that the durability of the ball bearing 1 will be impaired.

These kinds of problems can be suppressed by sufficiently reducing any dispersion in the volume of the rivets 11 however, doing so also causes an increase in the manufacturing cost of the rivets 11. Plural rivets 11 are used for one cage 7, so an increase in the manufacturing cost of the rivets 11 has a large effect on the manufacturing cost of a ball bearing 1 that includes the cage 7.

All of the rivets 11 assembled in the cage 7 are simultaneously crimped by the pair of crimping dies 18a, 18b, so the amount of compression for each rivet 11 cannot be adjusted according to differences in volumes of the rivets 11. Crimping each of the rivets 11 is not industrially performed and is not realistic from the aspect of balancing the strength of each of the joints.

Technology is disclosed in JP H11-179475 (A) in which the characteristics of rivet joint sections between flat sections are improved by devising the shape of the tip-end section of the rod section of the rivets and the shape of the crimping dies for pressing and crushing the tip-end section of the rod section. Moreover, JP 2009-008164 (A) discloses technology that suppresses the residual stress that occurs in the rivets due to the crimping process. However, in these conventional arts, eliminating problems due to differences in the volume of the plural rivets is not particularly taken into consideration.

RELATED LITERATURE

Patent Literature

[Patent Literature 1] JP H07-301242 (A)
[Patent Literature 2] JP H10-281163 (A)
[Patent Literature 3] JP H11-179475 (A)
[Patent Literature 4] JP 2009-008164 (A)
[Patent Literature 5] JP 2009-236227 (A)

SUMMARY OF INVENTION

Problem to be Solved by Invention

The object of the present invention is to provide construction of rivet joint sections of a ribbon cage and a method for realizing the construction that can improve the characteristics of joint sections between flat sections of a pair of cage elements of a ribbon cage without strictly restricting the manufacturing tolerances of the rivets that join the cage elements.

Means for Solving Problems

The ribbon cage of the present invention has a pair of cage elements that are circular-ring shaped and respectively have plural flat sections and plural semi-circular shaped sections that are alternatively arranged in the circumferential direction, and plural rivets. Typically, a material made of metal plate is used as the material for the cage elements. With the pair of cage elements assembled, the flat sections respectively form a pair between the pair of cage elements, and each of the pair of flat sections have circular holes that are formed in portions that are aligned with each other. With the pair of cage elements assembled, the inside surfaces of each of the pair of the flat sections abut on each other, the circular holes in each of the pair of the flat sections that abut on each other (that form a pair) are aligned with each other, and pockets for holding balls so as to be able to roll freely are formed between the inside surfaces of the semi-circular shaped sections that face each other between the pair of cage element.

With the pair of cage elements assembled, the plural rivets have rod sections that are inserted through the circular holes, and head sections and crimped sections that are formed on both end sections of the rod sections, and the head sections and the crimped sections join the pair of cage elements by holding the flat sections in between.

Particularly, in the ribbon cage of the present invention, the head section and the crimped section each has a flange section having an outer diameter that is larger than an inner diameter of each of the circular holes, an inside surface and an outside surface, the flange section pressing an outside surface of the flat sections by the inside surface, and a truncated cone shaped convex section formed on the outside surface of the flange section and having an outer diameter that becomes smaller going away from the outside surface (including a chamfered section that is formed on the peripheral edge of the flange section) of the flange sections, an apex and a bottom section, an outer diameter of the apex of the convex section being equal to or less than the inner diameter of each of the circular holes, and an outer diameter of the flange section being equal to or greater than an outer diameter of the bottom section of the convex section.

The thickness in the axial direction of each of the flange sections is a required and sufficient value for pressing the flat sections, and is a value capable of preventing the strength and rigidity from becoming excessively large, and preventing the load required for forming the flange sections by plastic deformation from becoming excessively large. Preferably, the thickness in the axial direction of each of the flange sections is equal to or less than the plate thickness of a metal plate of the pair of cage elements, and is equal to or greater than ½ that plate thickness.

Moreover, the minimum value of the thickness in the axial direction of each of the convex section is regulated from the aspect of working together with the flange section to maintain the strength of the joint between the flat sections, and the maximum value of the thickness in the axial direction of each of the convex section is regulated from the aspect of preventing the load required for forming the convex section by plastic deformation from becoming excessively large. Preferably, the thickness in the axial direction of each of the convex sections is equal to or less than the plate thickness of a metal plate of the pair of cage elements, and is equal to or greater than ½ that plate thickness. However, preferably, the thickness in the axial direction of the head section and the crimped section in total (the sum of the thickness in the axial direction of the flange section and the thickness in the axial direction of the convex section) is kept to 1.5 times or less the plate thickness.

When the flange section protrudes outward in the radial direction further than the convex section, the amount of that protrusion is preferably two times or less the thickness in the axial direction of the flange section. Moreover, preferably at least one of the head section and the crimped section has a stepped shape with a stepped surface facing in the axial direction that continues in an expanding outward radial direction from the bottom section of the convex section.

The manufacturing method for ribbon cage of the present invention first assembles together a pair of cage elements that are circular-ring shaped and have plural flat sections having circular holes and plural semi-circular shaped sections that are alternatively arranged in the circumferential direction, so as to match the inside surfaces of the flat sections so as to face each other, align the circular holes of the flat sections that face each other, and form pockets for holding balls so as to be able to roll freely between the inside surfaces of the semi-circular shaped sections that face each other.

Next, with the pair of cage elements assembled, the rod sections of the rivets each having a rod section and a head section that is formed around one end of the rod sections in an original shape are inserted through the circular holes, so as to make inside surfaces of the head sections of the rivets abut against outside surfaces of the flat sections on one side that abut on the flat sections on other side.

Then, a pair of crimping dies, each comprising truncated cone shaped concave sections in the portions that face the circular holes respectively, the inner diameter thereof being a maximum at the opening and becoming smaller going toward the rear, are arranged on both outsides in the axial direction of the rivets, and with the head sections placed inside the concave sections of one of the crimping dies, the tip-end sections of the rod sections of the rivets that protrude from the outside surfaces of the flat sections on the other side are pressed in the axial direction by the other crimping die to plastically deform the tip-end sections of the rod sections and the head sections of the rivets, so that the tip-end sections of the rod sections and the head section of the rivets are made into a structure each comprising: a flange section having an outer diameter that is larger than an inner diameter of each of the circular holes, the inside surface and the outside surface, the flange section pressing the outside surface of one of the flat sections; and a truncated cone shaped convex section formed on the outside surface of the flange section and having an outer diameter that becomes smaller going away from the outside surface of the flange section, an apex and a bottom section, the outer diameter of the apex of the convex section being equal to or less than the inner diameter of each of the circular holes, and the outer diameter of the flange section being equal to or greater than the outer diameter of the bottom section of the convex section.

Preferably the stroke of the pair of crimping dies is adjusted so that each of the flange sections has a thickness in the axial direction that is ½ or more and one time or less the plate thickness of each of the cage elements. Moreover, preferably the stroke of the pair of crimping dies is adjusted so that each of the convex sections has a thickness in the axial direction of ½ or more and one time or less the plate thickness of each of the cage elements. However, in this case, it is necessary to adjust the stroke of the pair of crimping dies so that the head section and the crimped section has a thickness in the axial direction in total that is 1.5 times or less the plate thickness of each of the cage elements.

When the rivets have different volumes due to manufacturing tolerances, preferably the stroke of the pair of crimping dies is adjusted so that for a rivet having the minimum volume within the manufacturing tolerance range, the outer diameter of the flange section can be maintained at a value equal to or greater than the outer diameter of the bottom section of the convex section; and for a rivet having the maximum volume within the manufacturing tolerance range, the amount of protrusion that the flange section protrudes from the convex section in the radial direction is two times or less the thickness in the axial direction of the flange section.

Rivets are used in which the head sections each has a truncated cone shape that corresponds to the inner surface of each of the concave sections of the one crimping die in the state before the rivets are pressed and crushed in the axial direction, and the thickness in the axial direction of the head sections in the original shape and the thickness in the axial direction of the tip-end sections of the rod sections of the rivet are respectively greater than the depth in the axial direction of the concave sections.

Effect of Invention

In the ribbon cage and manufacturing method thereof of the present invention, the shape and dimensions of the head section and crimped section that are formed on both end sections of a rivet are appropriately regulated, so it is possible to maintain good characteristics of the rivet joint section even when the manufacturing tolerance for the volume of the rivet is not particularly strict. In other words, even when the volume of a rivet is the minimum within the manufacturing tolerance range, by plastically deforming the rivet by strongly pressing and compressing the rivet in the axial direction, the flange sections of the head section and crimped section that are provided on both end sections in the axial direction of the rivet press together the flat sections that are placed on top of each other. Therefore, it is possible to bring the inside surfaces of the flat sections into close contact with each other with no gaps, and it is possible to sufficiently maintain the strength of the joint between flat sections.

Moreover, it is possible to maintain the thickness in the axial direction of the flange sections regardless of the rivet volume. Therefore, even when the rivet volume is the maximum within the manufacturing tolerance range, thin burrs that easily break away from the head section or crimped section do not occur in the head section or crimped section. As a result, it is possible to prevent loss of durability of the ball bearing due to a burr that breaks away from a rivet.

MODES FOR CARRYING OUT INVENTION

Figure 1:
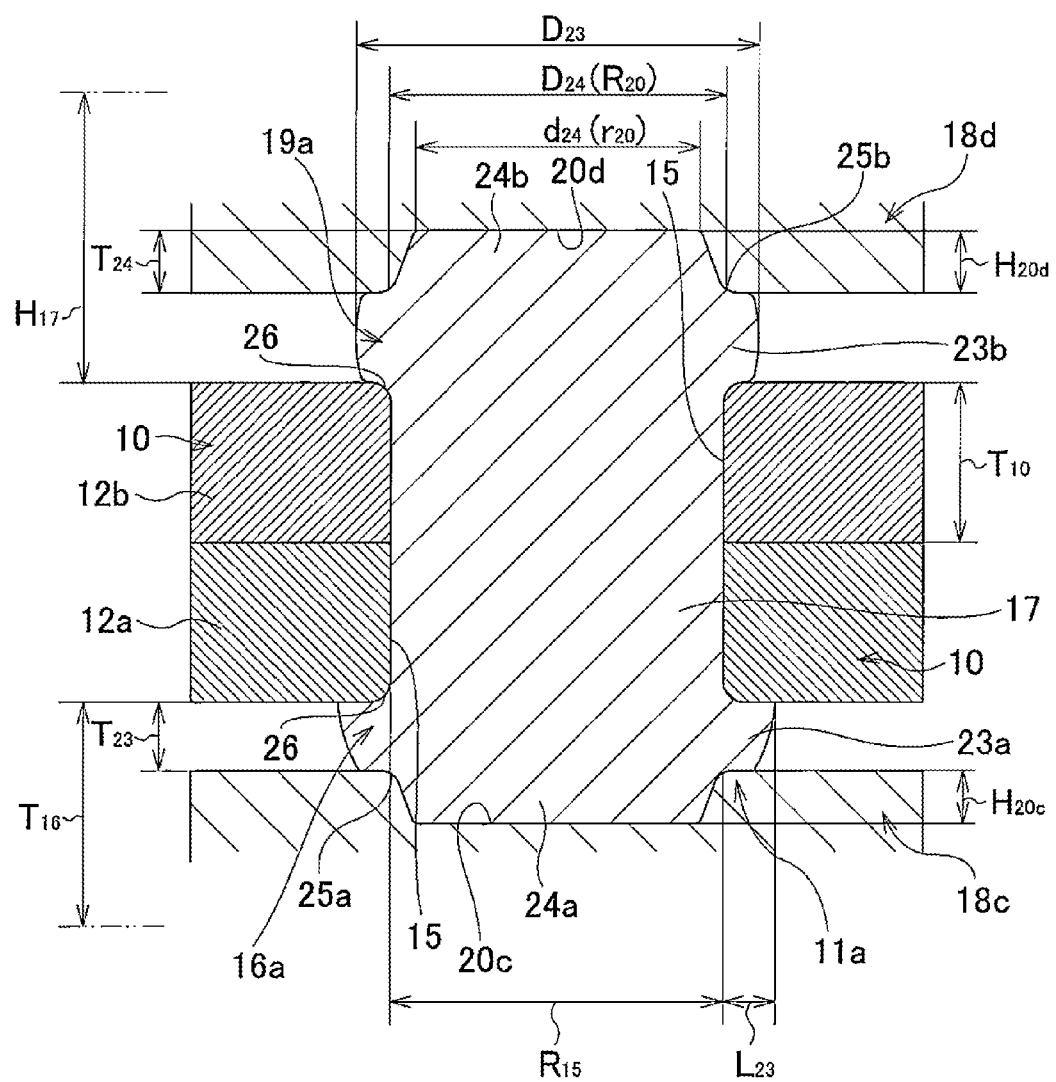
FIG. 1 is a cross-sectional view illustrating a first example of an embodiment of the present invention which illustrates a rivet joint section thereof.

FIG. 1, FIG. 2A and FIG. 2B illustrate a first example of an embodiment of the present invention. The ribbon cage of this example has a pair of cage elements 10 and plural rivets 11a that join and fasten the pair of cage elements 10 together. Each of the cage elements 10 is formed into a circular ring shape using metal plate such as steel plate or stainless steel plate, and has plural flat sections 12a, 12b and plural semi-circular shaped sections 13 (see FIG. 3) that are connected in an alternating manner in the circumferential direction. A circular hole 15 is formed in each of the flat sections 12a, 12b of the cage elements 10 in positions that are aligned with each other in the state that the pair of cage elements 10 is assembled. Moreover, with the pair of cage elements 10 assembled together, the inside surfaces of the flat sections 12a and flat sections 12b face each other, and pockets 14 for holding balls 6 so as to be able to roller freely are formed between the semi-circular shaped sections 13 of the pair of cage elements 10. A feature of the present invention, including this example, is the construction of the portions (joint sections) where, with the plural flat sections 12a, 12b that are provided in each of the pair of cage elements 10 of the ribbon cage being in contact with each other, the flat sections 12a, 12b are joined and fastened together with rivets 11a. The construction of the other parts of the ribbon cage is the same as in the conventional ribbon cage.

In this example as well, after the ribbon cage has been completed and in the state that the pair of cage elements 10 is assembled together, each of the rivets 11a has a rod section 17, and a head section 16a and a crimped section 19a that are formed on both end sections in the axial direction of the rod section 17. With the rod section 17 of a rivet 11a inserted through the circular holes 15 that are formed in the flat sections 12a, 12b of the pair of cage elements 10, the head section 16a and the crimped section 19a on both ends in the axial direction of the rod section 17 of the rivet 11a hold the flat sections 12a, 12b from both sides. Particularly, in this example, the head section 16 and crimped section 19a of a rivet 11a have two-layer structure having flange sections 23a, 23b and convex sections 24a, 24b. The flange section 23a and convex section 24a, and the flange section 23b and convex section 24b each have a shape that the direction of the contour line of the outer-circumferential surface of the head section 16a or crimped section 19a in the cross-sectional shape on a virtual plane that includes the center axis of the rivet 11a changes, the shape including a stepped shape having a stepped surface that faces in the axial direction. The two-layer structure of the head section 16 is obtained by expanding the original shape of the head section 16 that is formed beforehand into a truncated cone shape outward in the radial direction while pressing and crushing the head sections 16a in the axial direction by a crimping process. On the other hand, the two-layer structure of the crimped section 19a is obtained by expanding the tip-end section of the circular column shaped rod section 17 outward in the radial direction while pressing and crushing the tip-end section in the axial direction by a crimping process. The shapes at the beginning of processing differ from each other, so in the state after processing is complete, the shape of the head section 16a and the shape of the crimped section 19a differ from each other. However, in regards to the effect of the present invention, the head section 16a and crimped section 19 are common in that they have the same basic construction of a two-layer structure such as described above.

Figure 2:
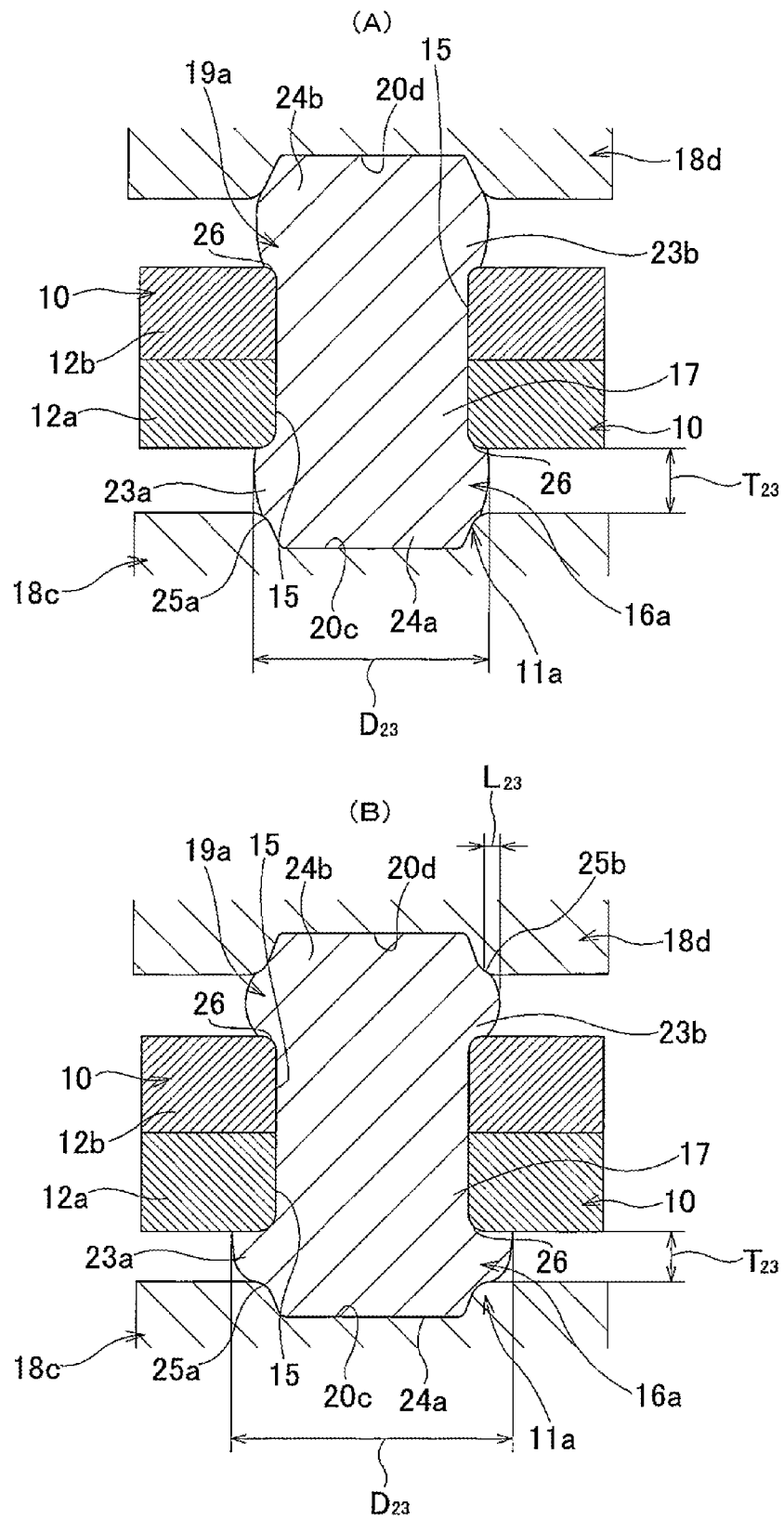
FIG. 2A is a view similar to FIG. 1, and illustrates the state when the volume of the rivet becomes the minimum within the tolerance range.
FIG. 2B is a view that illustrates the state when the volume of the rivet becomes the maximum within the tolerance range.
Figure 3:
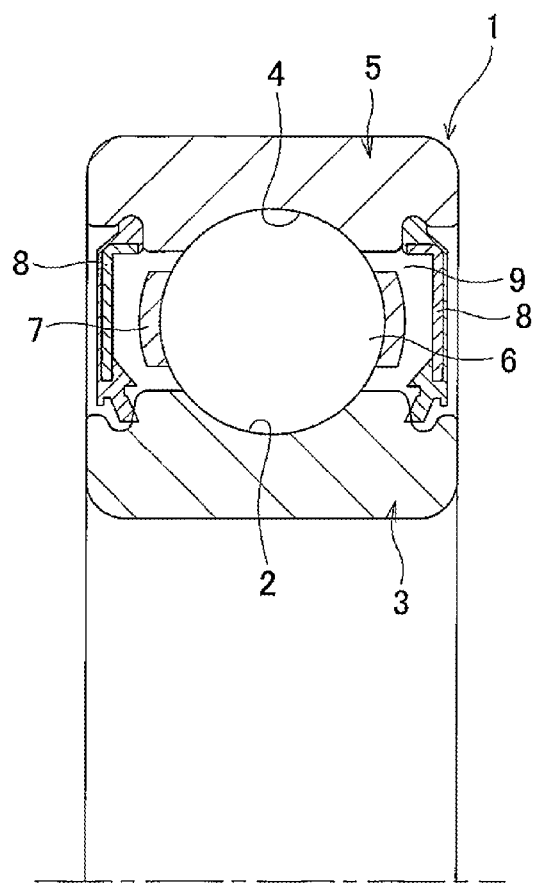
FIG. 3 is a half cross-sectional view of a ball bearing in which a ribbon cage is assembled, to which the present invention can be applied.

The flange sections 23a, 23b that make up the base half section of the head section 16a (the half in the axial direction on the flat section 12a side, the upper half in FIG. 1 and FIG. 2), and the base half section of the crimped section 19a (the half in the axial direction on the flat section 12b side, the lower half in FIG. 1 and FIG. 2) have an outer diameter $D_{23}$ that is larger than the inner diameter $R_{15}$ of the circular holes 15 that are formed in the flat sections 12a, 12b ($D_{23} > R_{15}$). The inside surfaces of these flange sections 23a, 23b press against the outside surfaces of the flat sections 12a, 12b, and perform the role of bringing the inside surfaces of these flat sections 12a, 12b into contact with each other with no gaps in between. The outside surfaces of the flat sections 12a, 12b include a chamfered section 26 that is formed on the peripheral edge of the opening of the circular hole 15. The thickness $T_{23}$ in the axial direction of these flange sections 23a, 23b is a required and sufficient value for pressing the flat sections 12a, 12b, and is a value that is capable of preventing the flange sections 23a, 23b from becoming too strong and rigid so that the load required for forming the flange sections 23a, 23b by plastic deformation does not become excessively large. In consideration of these points, the thickness dimension $T_{23}$ in the axial direction of the flange sections 23a, 23b is preferably no greater than the plate thickness $T_{10}$ of the metal plate of the cage elements 10, and is ½ or more the plate thickness $T_{10}$ ($T_{10}/2 \leq T_{23} \leq T_{10}$), and more preferably, is ½ or more and ¾ or less the plate thickness $T_{10}$. There is no need for the thickness $T_{23}$ to be the same for the flange section 23a on the head section 16a side and the flange section 23b on the crimped sections 19a side; and as described above, there are many cases in which the value is different. The plate thickness $T_{10}$ of the cage elements 10 is typically 0.2 mm to 1.0 mm. Therefore, the thickness $T_{23}$ in the axial direction of the flange sections 23a, 23b is 0.1 mm to 0.2 mm when the plate thickness $T_{10}$ of the cage elements 10 is 0.2 mm, and is 0.5 mm to 1.0 mm when the plate thickness $T_{10}$ of the retaining members 10 is 1.0 mm.

On the other hand, the convex sections 24a, 24b are formed on the outside surface of the flange sections 23a, 23b, and have a truncated cone shape, the outer diameter of which becomes smaller in the direction going away from the outside surface of the flange sections 23a, 23b. Of the convex sections 24a, 24b, the outer diameter of the apex (smallest diameter section) $d_{24}$ is equal to or less than the inner diameter $R_{15}$ of the circular holes 15 ($d_{24} \leq R_{15}$), and preferably is less than this inner diameter $R_{15}$ ($d_{24} < R_{15}$). Moreover, of the convex sections 24a, 24b, the outer diameter of the bottom section (largest diameter section) $D_{24}$ is larger than the outer diameter of the apex $d_{24}$ ($D_{24} > d_{24}$). Preferably, the outer diameter $D_{24}$ of the bottom section is equal to or greater than the inner diameter $R_{15}$ of the circular holes 15 ($D_{24} \geq R_{15}$), and even more preferably is larger than the inner diameter $R_{15}$ of the circular holes 15 ($D_{24} > R_{15}$). On the other hand, the outer diameter $D_{23}$ of the flange sections 23a, 23b is greater than the inner diameter $R_{15}$ of the circular holes 15 ($D_{23} > R_{15}$), and is equal to or greater than the outer diameter $D_{24}$ of the bottom section of the convex sections 24a, 24b ($D_{23} \geq D_{24}$), and preferably is greater than the outer diameter $D_{24}$ of the bottom section of the convex sections 24a, 24b ($D_{23} > D_{24}$). In the case of the convex sections 24a, 24b as well, it is not necessary for the outer diameter $d_{24}$ of the apex and the outer diameter $D_{24}$ of the bottom section to be the same as each other on the head section side 16a and the crimped sections side 19a, and as described above, there are many cases in which they actually differ. The inner diameter $R_{15}$ of the circular holes 15 that are formed in the flat sections 12a, 12b of the cage elements 10 is 0.6 mm to 3.3 mm. Therefore, in the case when the inner diameter $R_{15}$ of the circular holes 15 is 0.6 mm, the outer diameter $d_{24}$ of the apex of the convex sections 24a, 24b is preferably 0.2 mm or greater, and less than 0.6 mm; and in the case when the inner diameter $R_{15}$ of the circular holes 15 is 3.3 mm, the outer diameter $d_{24}$ of the apex of the convex sections 24a, 24b is preferably 1.5 mm or greater, and less than 3.3 mm.

Figure 5:
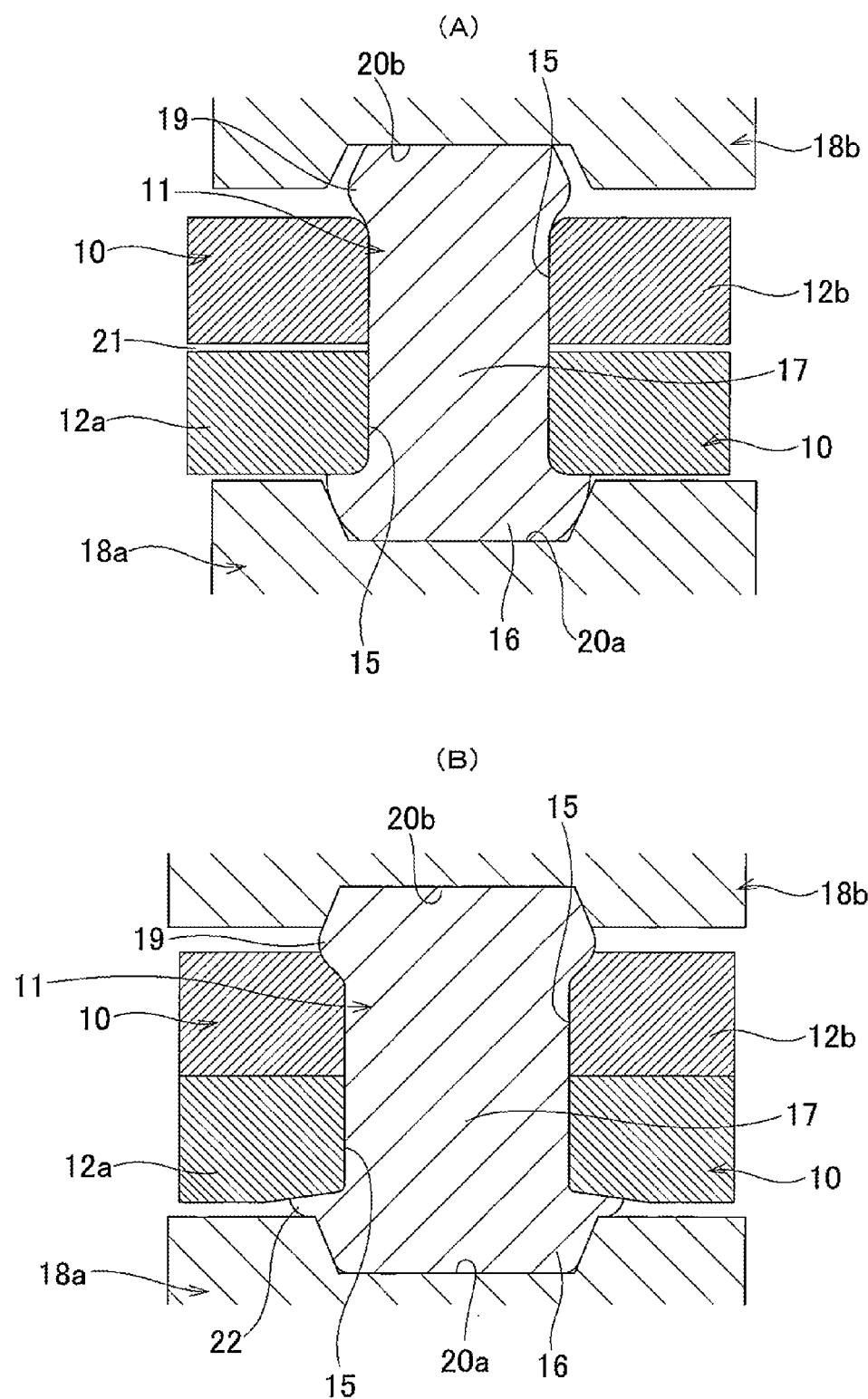
FIG. 5A and FIG. 5B are similar to FIG. 2A and FIG. 2B, and are for explaining the problems that occur in the conventional construction.

In any case, the flange sections 23a, 23b continue as is from the bottom section of the convex sections 24a, 24b toward the center in the axial direction of the rivet 11a ($D_{23}=D_{24}$, see the crimped section 19a side in FIG. 2A), or continue from the bottom section of the convex sections 24a, 24b in a state so as to expand outward in the radial direction, and then continues toward the center in the axial direction of the rivet 11 by way of stepped surfaces 25a, 25b that face in the axial direction ($D_{23}>D_{24}$; see FIG. 1, the head section 16a in FIG. 2A, and FIG. 2B). When the head section 16a or crimped section 19a have a stepped shape ($D_{23}>D_{24}$), and the flange sections 23a, 23b protrude outward in the radial direction more than the convex sections 24a, 24b, the amount of protrusion $L_{23}$ is equal to or less than two times the thickness $T_{23}$ in the axial direction of the flange sections 23a, 23b ($L_{23} \leq 2T_{23}$). When the outer diameter $D_{23}$ of the flange sections 23a, 23b is less than the outer diameter $D_{24}$ of the convex sections 24a, 24b (D23<D24), then, as in the case of the crimped section 19 in FIG. 5A, the pressing force on the flat sections 12a, 12b from the flange sections 23a, 23b becomes insufficient, and the joining force between the cage elements 10 is insufficient. On the other hand, when the amount of protrusion $L_{23}$ of the flange sections 23a, 23b becomes greater than two times the thickness $T_{23}$ in the axial direction of the flange sections 23a, 23b ($L_{23}>2T_{23}$), the processing amount (amount of elongation) of the flange sections 23a, 23b becomes excessive and it becomes easy for damage such as cracking to occur in the flange sections 23a, 23b. Therefore, when the inner diameter $R_{15}$ of the circular holes 15 is 0.6 mm, the outer diameter $D_{24}$ of the bottom section of the convex sections 24a, 24b, and the outer diameter $D_{23}$ of the flange sections 23a, 23b are preferably no less than 0.61 mm and no greater than 1.0 mm, and when the inner diameter $R_{15}$ of the circular holes 15 is 3.3 mm, the outer diameter $D_{24}$ of the bottom section of the convex sections 24a, 24b, and the outer diameter $D_{23}$ of the flange sections 23a, 23b are preferably no less than 3.4 mm and no greater than 5.2 mm. Moreover, when the head section 16a or crimped section 19a has a stepped shape, the amount of protrusion $L_{23}$ of the flange sections 23a, 23b is set according to the thickness $T_{23}$ (0.1 mm to 1.0 mm) in the axial direction of the flange sections 23a, 23b.

The minimum value of the thickness $T_{24}$ in the axial direction of the convex sections 24a, 24b is regulated from the aspect of maintaining the joint strength of the joint between the flat sections 12a, 12b together with the flange sections 23a, 23b; and the maximum value of this thickness $T_{24}$ in the axial direction is regulated from the aspect of preventing the load required for forming the convex sections 24a, 24b by plastic deformation from becoming excessively large. Therefore, in the case of the thickness $T_{24}$ in the axial direction of the convex sections 24a, 24b as well, preferably the thickness $T_{24}$ is equal to or less than the plate thickness $T_{10}$ of the metal plate of the cage elements 10, and ½ or more the plate thickness $T_{10}$ ($T_{10} \geq T_{24} \geq T_{10}/2$).

The basic numerical value of the thickness $T_{24}$ in the axial direction of the convex sections 24a, 24b is set in the same way as the thickness $T_{23}$ in the axial direction of the flange sections 23a, 23b. However, when the dimension of the thickness $T_{23}$ in the axial direction of the flange sections 23a, 23b is a maximum value ($T_{23}=T_{10}$), and the dimension of the thickness $T_{24}$ in the axial direction of the convex sections 24a, 24b is a maximum value ($T_{24}=T_{10}$), the thickness in the axial direction of the head section 16a and the crimped section 19a becomes excessively large. In other words, the thickness in the axial direction of the head section 16a and the crimped section 19a becomes sufficiently large enough or larger than necessary for maintaining the joint strength of the joint between the flat sections 12a, 12b, and becomes larger as the load required for processing the head section 16a and crimped section 19a becomes excessively large. Therefore, the sum of the thickness $T_{23}$ in the axial direction of the flange sections 23a, 23b and the thickness $T_{24}$ in the axial direction of the convex sections 24a, 24b ($T_{23}+T_{24}$) is preferably kept to 1.5 times or less the plate thickness $T_{10}$ (($T_{23}+T_{24}$)$\leq 1.5T_{10}$). Therefore, in the case when the plate thickness $T_{10}$ of the cage elements 10 is 0.2 mm, the maximum value of the thickness in the axial direction of the head section 16a and crimped section 19a ($=T_{23}+T_{24}$) is 0.3 mm; and in the case when the plate thickness $T_{10}$ of the cage elements 10 is 1.0 mm, the maximum value of the thickness ($=T_{23}+T_{24}$) is 1.5 mm.

Next, a manufacturing method for a ribbon cage that forms a head section 16a and a crimped section 19a having the shapes described above on both end sections in the axial direction of a rivet 11a, and joining and fastening flat sections 12a, 12b together with the rivet 11a will be explained. In the manufacturing method of this example, as a pair of crimping dies for pressing and crushing both sides in the axial direction of a rivet 11a, dies 18c, 18d provided with concave sections 20c, 20d formed in portions that respectively face the outside surfaces of the flat sections 12a, 12b are used. When crimping the rivet 11a, the concave sections 20c, 20d become concentric with the rivet 11a. The inner diameter $r_{20}$ of the deepest part of the concave sections 20c, 20d is set so as to match the outer diameter $d_{24}$ of the apex of the convex sections 24a, 24b. In other words, the inner diameter $r_{20}$ of the deepest part of the of the concave sections 20c, 20d of this example differs from that of the dies provided in the conventional crimping dies (see FIG. 5) in that the inner diameter $r_{20}$ is set to be equal to or less than the inner diameter $R_{15}$ of the circular holes 15 ($r_{20}=d_{24} \leq R_{15}$), and preferably less than the inner diameter $R_{15}$ ($r_{20}=d_{24}<R_{15}$). Similarly, the inner diameter $R_{20}$ of the opening of the concaves sections 20c, 20d is set so as to match the outer diameter $D_{24}$ of the bottom section of the convex sections 24a, 24b. Furthermore, the depth $H_{20}$ in the axial direction of the concave sections 20c, 20d is also set so as to match the thickness $T_{24}$ in the axial direction of the convex sections 24a, 24b.

Figure 4:
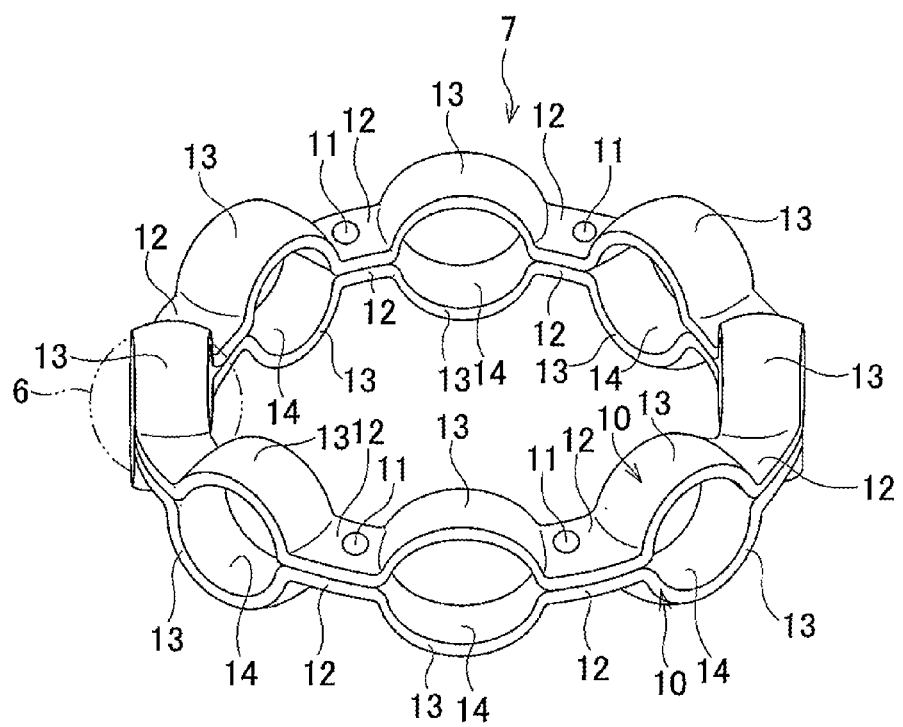
FIG. 4 is a perspective view illustrating a ribbon cage that has been removed from the ball bearing of FIG. 3.

Moreover, a rivet having a head section 16a, the original shape of which is formed in advance to have a truncated cone shape, is used as the rivet 11a. In other words, the original shape of the head section 16a has a truncated cone shape such that in the state before the rivet 11a is pressed and crushed in the axial direction between the crimping dies 18c, 18d, the outer diameter on the inside surface side (tip-end side) is large, and the outer diameter on the outside surface side (base-end side) is small. The outer diameter on the inside surface side of the original shape of the head section 16a is larger than the rod section 17 and the inner diameter $R_{15}$ of the circular hole 15 of the flat section 12a, and has a size such that the inside surface of the original shape of the head section 16a comes in contact with the outside surface of the flat section 12a. The outer diameter on the outside surface side of the original shape of the head section 16a is arbitrary, however, preferably the outside surface side of the original shape of the head section 16a is a shape that corresponds to the inner surface of the concave section 20c of the crimping die 18c. The inclination angles of the partial conical surface portions are preferably matched between the inner-circumferential surface of the concave section 20c and the outer-circumferential surface of the original shape of the head section 16a, however, the above inclination angles does not absolutely have to match, and it is sufficient that the above inclination angles substantially match between them. The crimping dies 18c, 18d have circular ring-shaped pressure sections, and in order to plastically deform the plural rivets 11a of one cage 7 (see FIG. 4) simultaneously, the position where the crimping dies 18c, 18d come closest to each other is appropriately regulated by adjusting the stroke of the dies, and the state in which the crimping dies 18c, 18d have reached that closest position to each other is determined to be the completed state for crimping of the rivets 11a. This point is the same as in the case of conventional construction illustrated in FIG. 5.

Particularly, in the case of performing the manufacturing method of this example, in the state before the crimping process, the thickness dimension $T_{16}$ in the axial direction of the original shape of the head section 16a is sufficiently larger than the depth $H_{20c}$ in the axial direction of the concave section 20c that is formed in the crimping die 18c on the side that is plastically processing the original shape of this head section 16a, and preferably, the thickness $T_{16}$ in the axial direction is about two times to four times the depth $H_{20c}$ in the axial direction ($T_{16}$=(2 to 4)$H_{20c}$). Therefore, in order to join and fasten the flat sections 12a, 12b together with a rivet 11a, the tip-end half of the original shape of the head sections 16a is fitted inside the concave section 20c that in formed in the crimping die 18c, and in this state, the middle section to the base-end half of the head section 16a is exposed (protrudes out from) in the axial direction from the concave section 20c.

On the other hand, the tip-end section of the rod section 17 of a rivet 11a is sufficiently exposed from the outside surface of the flat section 12b on the opposite side from the head section 16a. In the state before the tip-end section of the rod section 17 is plastically deformed and the crimped section 19a is formed on that tip-end section, the amount of protrusion $H_{17}$ that the tip-end section of the rod section 17 protrudes from the outside surface of the flat section 12b is sufficiently maintained so that the shape of the crimped section 19a can be obtained. More specifically, the amount of protrusion $H_{17}$ is about two to four times the depth $H_{20d}$ in the axial direction of the concave section 20d that is formed in the crimping die 18d on the side that presses and crushes the tip-end section of the rod section 17 ($T_{17}$=(2 to 4)$H_{20d}$). Therefore, in order to join and fasten the flat sections 12a, 12b together using a rivet 11a, the tip-end section of the rod section 17 is inserted into the concave section 20d that is formed in the crimping die 18d, and in this state, the portion near the middle in the axial direction than the tip-end section of the rod section 17 is exposed (protrudes out from) in the axial direction from the concave section 20d.

When the crimping dies 18c, 18d approach each other by a predetermined stroke from the state describe above, both end sections in the axial direction of the rivet 11a are plastically deformed by being pressed and crushed. The specified amount of stroke is set so that, at the position where the portions of the crimping dies 18c, 18d where the concave sections 20c, 20d are not formed are nearest to each other, the space between the crimping dies 18c, 18d corresponds to the total amount of the plate thicknesses $T_{10}$ of the cage elements 10 (flat sections 12a, 12b) and the predetermined thicknesses $T_{23}$ in the axial direction of the flange sections 23a, 23b. In other words, the stroke of the crimping dies 18c, 18d is adjusted so that the space between both dies 18c, 18d at the position where the dies 18c, 18d are nearest to each other is $2T_{10}+2T_{23}$. The space between the crimping dies 18c, 18d at the position where the dies 18c, 18d are nearest to each other in this example is larger than the space between the crimping dies 18a, 18b at the position where the dies 18a, 18b are nearest to each other in the conventional technology in which flange sections 23a, 23b are not provided.

In this way, a head section 16a and crimped section 19a having flange sections 23a, 23b and convex sections 24a, 24b are formed on both end sections in the axial direction of a rivet 11a as illustrated in FIG. 1 and FIGS. 2A and 2B. The flat sections 12a, 12b are firmly joined and fastened by the head section 16a and crimped section 19a.

By giving both end sections in the axial direction of a rivet 11a the shape described above by using the manufacturing method described above, it is possible to make the characteristics of the joint section between flat sections 12a, 12b by a rivet 11a good even when there are differences due to tolerances in the volumes of plural rivets 11a that constitute a joining element for one cage 7.

When the volume of a rivet 11a is the minimum within the manufacturing tolerance range, the section that is joined and fastened by the rivet 11a is as illustrated in FIG. 2A. In this state, the difference between the outer diameter $D_{23}$ of the flange sections 23a, 23b of the head section 16a and crimped section 19a and the inner diameter $R_{15}$ of the circular holes 15 is small. However, not only a flange section 23a is provided in the head section 16a, but also a flange section 23b having an inside surface is formed in the crimped section 19a. The inside surfaces of the flange sections 23a, 23b come in strong contact with the outside surfaces of the flat sections 12a, 12b, and cause the inside surfaces of the flat sections 12a, 12b to come in contact with each other with no gap in between. Moreover, it is possible to sufficiently maintain the thickness $T_{23}$ in the axial direction of the flange sections 23a, 23b, and also sufficiently maintain the strength and rigidity by which these flange sections 23a, 23b press against the flat sections 12a, 12b. Therefore, even in a joint section by a rivet 11a having a small volume, it is possible to sufficiently maintain the strength of the joint between the flat sections 12a, 12b.

On the other hand, when the volume of a rivet 11a becomes the maximum in the manufacturing tolerance range, the section that is crimped and fastened by the rivet 11a is in a state as illustrated in FIG. 2B. In this state, the outer diameter $D_{23}$ of the flange sections 23a, 23b of the head section 16a and crimped section 19a become sufficiently larger than the inner diameter of the circular holes 15. Moreover, the inside surfaces of the flange sections 23a, 23b come in strong contact with the outside surfaces of the flat sections 12a, 12b and cause the inside surfaces of these flat sections 12a, 12b to come in contact with each other with no gap in between. Even in this state, the thickness $T_{23}$ in the axial direction of the flange sections 23a, 23b is sufficiently maintained, so thin burrs that break away easily from the head section 16a and crimped section 19a do not occur in any portions of the head section 16a and crimpled section 19a. Therefore, it is possible to prevent loss in durability of the ball bearing due to burrs that break away from a rivet 11a.

Regardless of the size of the volume of a rivet 11a, in this example, the diameter $d_{24}$ of the apex of the convex sections 24a, 24b is equal to or less than the inner diameter $R_{15}$ of the circular holes 15, so the axial force that is applied to the rivet 11a from the crimping dies 18c, 18d can be sufficiently applied to the rod section 17 of the rivet 11a. In other words, the axial force that is applied to the rivet 11a is not only consumed in pressing the flat sections 12a, 12b together, but is also used for compressing the rod section 17 in the axial direction. As a result, as the rod section 17 is compressed in the axial direction, the outer diameter of the rod section 17 is expanded, and the outer-circumferential surface of the rod section 17 can be fitted with the inner-circumferential surfaces of the circular holes 15 with no gaps. Consequently, in the joint sections between flat sections 12a, 12b by rivets 11a, not only is it possible to suppress looseness in the axial direction of the cage 7, but it is also possible to sufficiently suppress looseness in the circumferential direction and radial direction of the cage 7.

EXPLANATION OF REFERENCE NUMBERS

1 Ball bearing
2 Inner-ring raceway
3 Inner ring
4 Outer-ring raceway
5 Outer ring
6 Ball
7 Cage
8 Seal ring
9 Space
10 Cage element
11, 11a Rivet
12, 12a, 12b Flat section
13 Semi-circular shaped section
14 Pocket
15 Circular hole
16, 16a Head section
17 Rod section
18a, 18b, 18c, 18d Crimping die
19, 19a Crimped section
20a, 20b, 20c, 20d Concave section
21 Gap
22 Burr
23a, 23b Flange section
24a, 24b Convex section
25a, 25b Stepped surface
26 Chamfered section

What is claimed is:

1. A ribbon cage comprising:
    a pair of cage elements each having a circular-ring shape and comprising plural flat sections having circular holes and plural semi-circular shaped sections that are alternatively arranged in a circumferential direction, such that, with the pair of cage element assembled together, inside surfaces of the flat sections face each other, the circular holes of the flat sections that face each other are aligned with each other, and pockets for holding balls are formed between inside surfaces of the semi-circular shaped sections that face each other; and
    plural rivets joining the pair of cage elements and, with the pair of cage elements assembled, each of the plural rivets comprising a rod section that is inserted through an aligned pair of the circular holes, and a head section and a crimped section that are formed on oppositely-disposed end sections of the rod section, such that the plural rivets hold the flat sections of the pair of cage elements between the head sections and the crimped sections of the plural rivets;
    the head section and the crimped section of each of the plural rivets each comprising a flange section having an inside surface, an outside surface, and an outer diameter that is larger than an inner diameter of each of the circular holes, the flange section pressing an outside surface of the flat sections by the inside surface of the flange section, and a truncated cone shaped convex section formed on the outside surface of the flange section and having an apex, a bottom section, and an outer diameter that becomes smaller going away from the outside surface of the flange section, an outer diameter of the apex of the convex section being equal to or less than the inner diameter of each of the circular holes, and an outer diameter of the flange section being equal to or greater than an outer diameter of the bottom section of the convex section, and the flange section protruding further outward than the convex section in a radial direction of the rivet, with an amount of protrusion being two times or less a thickness of the flange section in an axial direction of the rivet.

2. The ribbon cage according to claim 1, wherein the flange section and the convex section each has a thickness in the axial direction that is ½ or more than a plate thickness of each of the cage elements and equal to or less than the plate thickness, and the head section and the crimped section have a total thickness in the axial direction that is 1.5 times or less than the plate thickness of each of the cage elements.

3. The ribbon cage according to claim 1, wherein at least one of the head section and the crimped section has a stepped shape of which there is a stepped surface that faces in the axial direction and that is continuous in a state that expands outward in the radial direction from the bottom section of the convex section.

4. A manufacturing method for a ribbon cage, comprising the steps of:
    assembling together a pair of cage elements each having a circular-ring shape and comprising plural flat sections having circular holes and plural semi-circular shaped sections that are alternatively arranged in a circumferential direction, so as to match inside surfaces of the flat sections so as to face each other, align the circular holes of the flat sections that face each other, and form pockets for holding balls between the inside surfaces of the semi-circular shaped sections that face each other;
    preparing rivets each having a rod section and a head section that is formed around one end of the rod section thereof in an original shape, and inserting the rod sections of the rivets through an aligned pair of the circular holes with the pair of cage elements assembled, so as to make inside surfaces of the head sections of the rivets abut against outside surfaces of the flat sections on one side of the pair of cage elements and disposed opposite of outside surfaces of the flat sections on an other side of the pair of cage elements; and
    arranging a pair of crimping dies, each comprising truncated cone shaped concave sections in portions that face the circular holes respectively, the inner diameter thereof being a maximum at an opening and becoming smaller going toward a rear, on both outsides in an axial direction of the rivets, and with the head sections placed inside the concave sections of one of the crimping dies, pressing tip-end sections of the rod sections of the rivets that protrude from the outside surfaces of the flat sections on the other side in the axial direction by another of the crimping dies to plastically deform the tip-end sections of the rod sections and the head sections of the rivets, so that the tip-end sections of the rod sections and the head sections of the rivets are made into a structure each comprising a flange section having an inside surface, an outside surface, and an outer diameter that is larger than an inner diameter of each of the circular holes, the flange section pressing the outside surface of one of the flat sections, and a truncated cone shaped convex section formed on the outside surface of the flange section and having an apex, a bottom section, and an outer diameter that becomes smaller going away from the outside surface of the flange section, an outer diameter of the apex of the convex section being equal to or less than the inner diameter of each of the circular holes, and an outer diameter of the flange section being equal to or greater than an outer diameter of the bottom section of the convex section, and the flange section protruding further outward than the convex section in a radial direction of the rivet, with an amount of protrusion being two times or less a thickness of the flange section in the axial direction.

5. The manufacturing method for a ribbon cage according to claim 4, wherein a stroke of the pair of crimping dies is adjusted so that the flange section and the convex section each have a thickness in the axial direction that is ½ or more than a plate thickness of the cage elements and equal to or less than the plate thickness, and the head section and the crimped section have a total thickness in the axial direction that is 1.5 times or less than the plate thickness of the cage element.

6. The manufacturing method for a ribbon cage according to claim 4, wherein a stroke of the pair of crimping dies is adjusted such that, when the rivets have different volumes due to manufacturing tolerances, for a rivet having a minimum volume within a manufacturing tolerance range, the outer diameter of the flange section is maintained at a value equal to or greater than the outer diameter of the bottom section of the convex section, and for a rivet having a maximum volume within the manufacturing tolerance range, the amount of protrusion that the flange section protrudes from the convex section in the radial direction is two times or less than a thickness of the flange section in the axial direction.

7. The manufacturing method for a ribbon cage according to claim 4, wherein, the head sections of the rivets each have a truncated cone shape that corresponds to an inner surface of each of the concave sections of the one crimping die in a state before the rivets are pressed and crushed in the axial direction, and a thickness in the axial direction of the head sections in the original shape and a thickness in the axial direction of the tip-end sections of the rod sections of the rivets are respectively greater than a depth in the axial direction of the concave sections.

* * * * *